(12) United States Patent
Ohmura et al.

(10) Patent No.: US 6,700,287 B2
(45) Date of Patent: Mar. 2, 2004

(54) CORE OF MOTOR HAVING CORE SHEETS STACKED TOGETHER AND METHOD FOR STACKING THE SAME

(75) Inventors: Jun Ohmura, Hamamatsu (JP); Ichirou Arai, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 44 days.

(21) Appl. No.: 10/020,944

(22) Filed: Dec. 19, 2001

(65) Prior Publication Data

US 2002/0079778 A1 Jun. 27, 2002

(30) Foreign Application Priority Data

Dec. 27, 2000 (JP) ..................... 2000-396730
Jun. 22, 2001 (JP) ..................... 2001-189561

(51) Int. Cl.[7] .............................................. H02K 1/32
(52) U.S. Cl. ...................................................... 310/217
(58) Field of Search ................. 310/216–218, 310/91; 29/596–598

(56) References Cited

U.S. PATENT DOCUMENTS

| | | | | |
|---|---|---|---|---|
| 4,642,502 A | * | 2/1987 | Carpenter et al. | ..... 310/156.12 |
| 4,841,186 A | * | 6/1989 | Feigel et al. | ........... 310/156.12 |
| 5,142,178 A | * | 8/1992 | Kloster et al. | ............... 310/217 |
| 5,760,520 A | * | 6/1998 | Hasebe et al. | ............... 310/261 |
| 5,861,700 A | * | 1/1999 | Kim | ........................... 310/261 |
| 5,986,366 A | * | 11/1999 | Bailey et al. | .................. 310/52 |

FOREIGN PATENT DOCUMENTS

| JP | U-3-60855 | 6/1991 |
|---|---|---|
| JP | A-5-56581 | 3/1993 |

* cited by examiner

*Primary Examiner*—Tran N. Nguyen
(74) *Attorney, Agent, or Firm*—Posz & Bethards, PLC

(57) ABSTRACT

Core sheets are progressively displaced one after the other by a predetermined displacement angle in a circumferential direction of a core in such a manner that stays of the core sheets form a plurality of stairstep-shaped guide walls. Each core sheet includes projections, recesses and a through hole, which are all arranged along a concentric circle that is concentric to a rotational axis of a rotatable shaft of a motor. The projections are arranged in a first axial end surface of the core sheet, and the recesses and the through hole are arranged in a second axial end surface of the core sheet in such a manner that each projection of the core sheet is opposed to a corresponding one of the recesses of the core sheet in the axial direction of the core.

27 Claims, 12 Drawing Sheets

CORE OF MOTOR HAVING CORE SHEETS STACKED TOGETHER AND METHOD FOR STACKING THE SAME

CROSS REFERENCE TO RELATED APPLICATION

This application is based on and incorporates herein by reference Japanese Patent Application No. 2000-396730 filed on Dec. 27, 2000 and Japanese Patent Application No. 2001-189561 filed on Jun. 22, 2001.

BACKGROUND OF THE INVENTION

1. Field of the Invention

The present invention relates to a core of a motor, which has a plurality of core sheets stacked together. The present invention also relates to a method for stacking the core sheets.

2. Description of Related Art

Generally, a motor has a rotatable shaft, to which a core and a commutator are secured. Windings are wound around the core and are electrically connected to the commutator. The core is formed by stacking a plurality of core sheets together.

With reference to FIG. 11, for example, a casing 52 of one previously proposed motor 51 receives a core 53. The core 53 includes a plurality of stacked core sheets 61. Each core sheet 61 has an inner annular portion 62 and an outer annular portion 63. A rotatable shaft 57 is received through the inner annular portion 62 of each core sheet 61. The outer annular portion 63 of each core sheet 61 has a plurality of teeth 64 that extend radially outward from the outer annular portion 63. Window openings 65 are arranged in a space between the inner annular portion 62 and the outer annular portion 63 of each core sheet 61. The inner annular portion 62 is connected to the outer annular portion 63 through a plurality of stays 66. A commutator 54 is secured around a lower end portion of the rotatable shaft 57, which is located on a first surface 53a side of the core 53. Brushes 55 are arranged to slide along the commutator 54. A bearing 56 is secured to an upper end portion of the rotatable shaft 57, which is located on a second surface 53b side of the core 53. Non-contact type seals 73 are arranged in the bearing 56.

In this type of the motor, brush powder, which is generated from the brushes 55 through abrasion when the brushes 55 slide along the commutator 54, can penetrate into the bearing 56. To address this problem, one such motor has a dustproof cover 71 secured to the bearing 56 to cover the bearing 56, as shown in FIG. 12A. In place of the non-contact type seals 73, another such motor has contact type seals 72, which prevent the penetration of the brush powder into the bearing 56, as shown in FIG. 12B.

However, the dustproof cover 71 shown in FIG. 12A is a separate component that is provided separately from the bearing 56. This causes an increase in the number of the required components of the motor 51. Furthermore, a separate step is required to install the dust proof cover 71 in the bearing 56. Use of the contact type seals 72 shown in FIG. 12B causes an increase in a manufacturing cost of the motor in comparison to the other motor that uses the non-contact type seals 73. As a result, there is a disadvantage of increasing the manufacturing cost of the motor 51.

SUMMARY OF THE INVENTION

The present invention addresses the above disadvantage. Thus, it is an objective of the present invention to provide a core of a motor, which includes a plurality of core sheets stacked together and allows a reduction in a manufacturing cost of the motor. It is another objective of the present invention to provide a method for stacking the core sheets of the core.

To achieve the objectives of the present invention, there is provided a core of a motor including a plurality of core sheets, which are of one type and are stacked together. Each core sheet includes an inner annular portion, an outer annular portion and a plurality of stays. The stays are arranged at equal angular intervals in a circumferential direction of the core sheet and connect the inner annular portion to the outer annular portion, so that each adjacent two stays of the core sheet define a window opening therebetween. The inner annular portion has a rotatable shaft securing hole that extends through a center of the inner annular portion in an axial direction of the core to receive a rotatable shaft of the motor. The outer annular portion includes a plurality of teeth that are arranged at equal angular intervals in the circumferential direction of the core sheet and extend radially outward from the outer annular portion. Each adjacent two teeth of the core sheet define a slot therebetween. Each core sheet further includes at least one projection, at least one recess and a receiving portion, which are all arranged along a concentric circle that is concentric to a rotational axis of the rotatable shaft of the motor. The at least one projection is arranged in a first axial end surface of the core sheet. The at least one recess and the receiving portion are arranged in a second axial end surface of the core sheet in such a manner that each one of the at least one projection of the core sheet is opposed to a corresponding one of the at least one recess of the core sheet in the axial direction of the core. At least two adjacent core sheets of the core sheets are displaced one after the other by a predetermined displacement angle in a circumferential direction of the core in such a manner that the stays of one of the at least two adjacent core sheets are partially overlapped with the stays of the other one of the at least two adjacent core sheets, respectively, and the slots of the one of the at least two adjacent core sheets are aligned with the slots of the other one of the at least two adjacent core sheets in the axial direction of the core, respectively. The second axial end surface of the one of the at least two adjacent core sheets is opposed to the first axial end surface of the other one of the at least two adjacent core sheets. Each one of the at least one projection arranged in the first axial end surface of the other one of the at least two adjacent core sheets is substantially, entirely received in a corresponding one of the receiving portion and the at least one recess arranged in the second axial end surface of the one of the at least two adjacent core sheets. Thus, the first axial end surface of the other one of the at least two adjacent core sheets closely contacts the second axial end surface of the one of the at least two adjacent core sheets.

The at least one projection, the at least one recess and the receiving portion of each core sheet can be arranged such that each core sheet is engageable with adjacent one of the core sheets only when each core sheet is placed in one of first and second angular positions with respect to the adjacent one of the core sheets. Each core sheet is placed in the first angular position when the receiving portion of each core sheet is aligned with the receiving portion of the adjacent one of the core sheets in the axial direction of the core. Each core sheet is placed in the second angular position when each core sheet is displaced by the predetermined displacement angle with respect to the adjacent one of the core sheets in the circumferential direction of the core.

Also, the core sheets can be progressively displaced one after the other by the predetermined displacement angle in the circumferential direction of the core in such a manner that the stays of the core sheets form a plurality of stairstep-shaped guide walls that are circumferentially spaced from each other and spirally extend in the axial direction of the core. The stairstep-shaped guide walls guide and force air to flow in the axial direction of the core through the window openings of the core sheets when the core is rotated.

Furthermore, to achieve the objectives of the present invention, there is also provided a method for stacking the core sheets of the core of the motor. The method includes a process of stacking the core sheets such that the core sheets are progressively displaced one after the other by a predetermined displacement angle in a circumferential direction of the core in such a manner that the stays of the core sheets form a plurality of stairstep-shaped guide walls that are circumferentially spaced from each other and spirally extend in the axial direction of the core, while the slots of one of each two adjacent core sheets are aligned with the corresponding slots of the other one of the two adjacent core sheets in the axial direction of the core, and the stairstep-shaped guide walls guide and force air to flow in the axial direction of the core through the window openings of the core sheets when the core is rotated.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

A motor that has a core according to a first embodiment of the present invention will be described with reference to FIGS. 1 to 3B.

Figure 1:
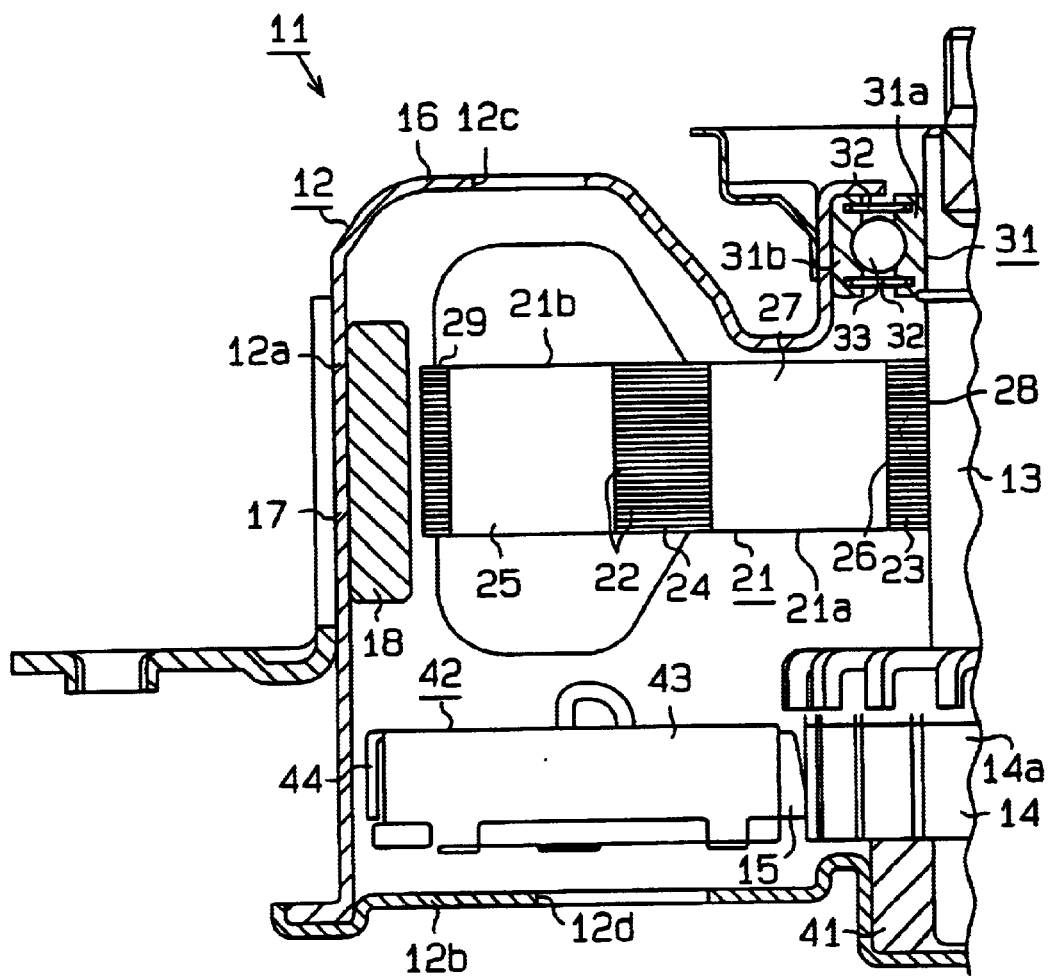
FIG. 1 is a partial cross-sectional view of a motor according to a first embodiment of the present invention.
Figure 2A:
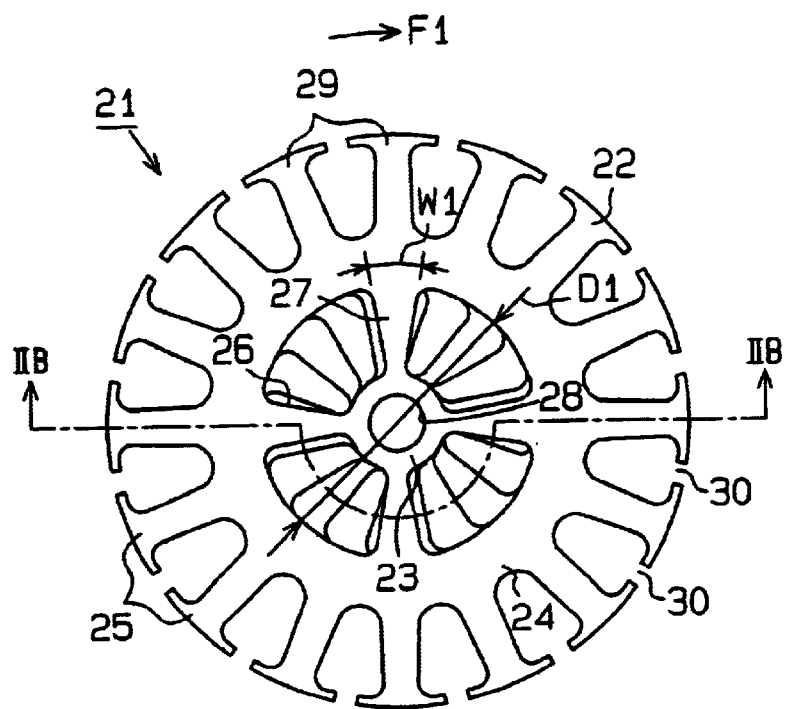
FIG. 2A is a plan view of a core according to the first embodiment.
Figure 2B:
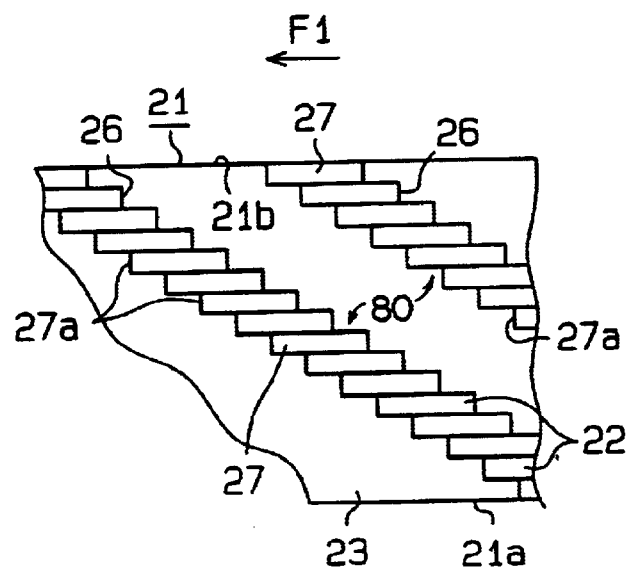
FIG. 2B is a schematic partial cross-sectional view taken along line IIB—IIB in FIG. 2A.

With reference to FIG. 1, a motor housing (acting as a casing of the present invention) 12 of a direct current motor (acting as the motor of the present invention) 11 includes a housing main body 12a and an end plate 12b. A plurality of magnets 18 are secured to an inner surface of a second wall 17 of the housing main body 12a. A plurality of second housing openings (acting as air inlet openings in this embodiment) 12c, through which the air is taken into an interior of the motor housing 12, are formed in a first wall 16 of the housing main body 12a. A plurality of first housing openings (acting as air outlet openings in this embodiment) 12d, through which the air is expelled from the motor housing 12, are formed in the end plate 12b. The second housing openings 12c and the first housing openings 12d are arranged in the motor housing 12 in opposed relationship to each other.

As shown in FIG. 1, a pair of brush holding devices 42 are arranged above the end plate 12b in diametrically opposed relationship to each other. These brush holding devices 42 are placed above the first housing openings 12d. Each brush holding device 42 includes a brush holder 43, a stopper (spring stop element) 44, a spring (not shown) and a brush 15. Each brush holder 43 is shaped into a generally rectangular tube. A longitudinal direction of the brush holder 43 extends in a left-right direction in FIG. 1. The stopper 44 closes a base end of the brush holder 43. The brush 15 is received in the brush holder 43 and is electrically connected to a power source (not shown). The brush 15 is urged in a direction away from a distal end of the brush holder 43 by an urging force of the spring.

A generally cylindrical bearing 41 is secured to an inner surface of the end plate 12b at the center thereof. The bearing 41 is radially positioned between the opposed brush holding devices 42. The bearing 41 is a sintered component and includes bearing oil. One end of the rotatable shaft 13 is received in the baring 41. Thus, the rotatable shaft 13 is rotatable relative to the bearing 41.

With reference to FIG. 1, a core 21 is fitted around a longitudinal center portion of the rotatable shaft 13. The core 21 is arranged to rotate integrally with the rotatable shaft 13 about a rotational axis thereof in a direction of an arrow F1 in FIG. 2. With reference to FIG. 1, a generally cylindrical commutator 14 is fitted around a lower end portion of the rotatable shaft 13, which is located on a first surface 21*a* side of the core 21. A plurality of metal plates 14*a* are secured around an outer peripheral surface of the commutator 14 and are circumferentially spaced from each other. A distal end surface of each brush 15 is arranged to engage with each metal plate 14*a* at a predetermined angle. Thus, when the core 21 rotates, the brushes 15 slide along the metal plates 14*a*. At this stage, the brushes 15 wear and generate brush powder.

A ring-shaped bearing 31 is fitted around an upper end portion of the rotatable shaft 13, which is located on a second surface 21*b* side of the core 21. The bearing 31 is constructed such that a ball 33 is clamped between a rotatable ring 31*a* and a stationary ring 31*b*. The rotatable ring 31*a* is secured to the rotatable shaft 13. The stationary ring 31*b* is secured to the first wall 16 of the housing main body 12*a*. The bearing 31 includes a pair of non-contact type seals 32 that are arranged on opposed sides of the ball 33, respectively.

Figure 3A:
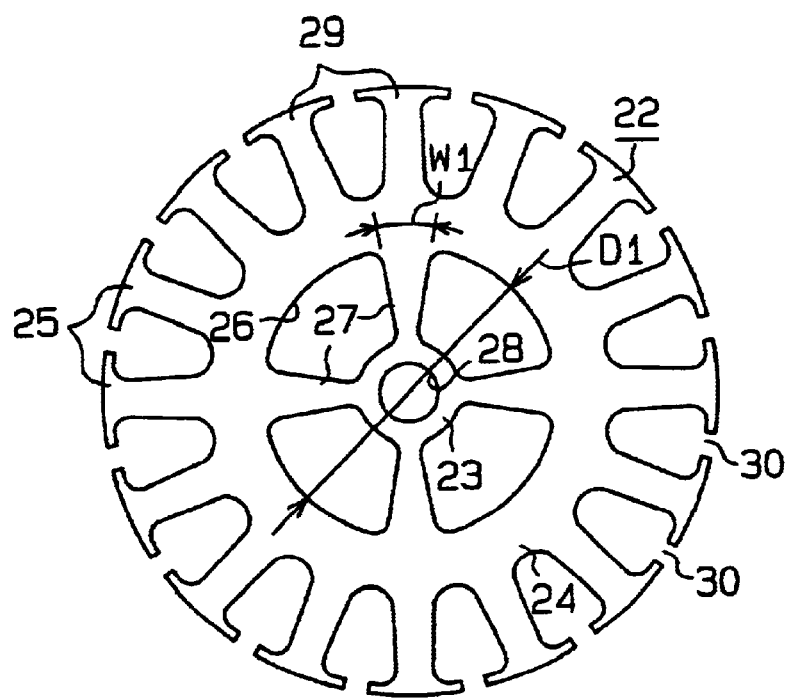
FIG. 3A is a plan view of one of core sheets of the core according to the first embodiment.
Figure 3B:
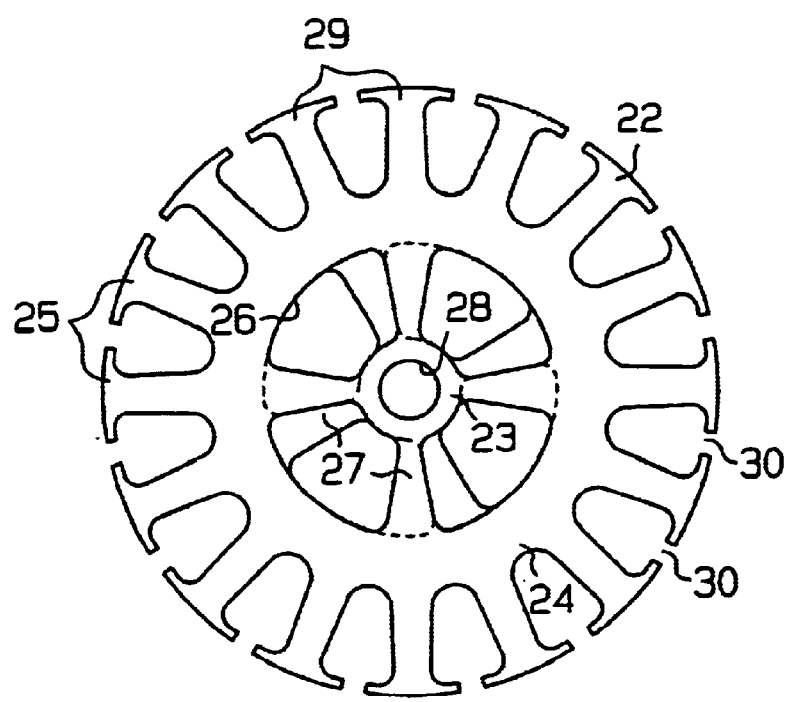
FIG. 3B is a plan view of the core sheets, each one of which is similar to one shown in FIG. 3A.

With reference to FIGS. 1 to 3, the core 21 includes a plurality of core sheets 22, each one of which is made of a thin steel plate. The core sheets 22 are stacked together one after the other. With reference to FIG. 3A, each core sheet 22 includes an inner annular portion 23 and an outer annular portion 24. A rotatable shaft securing hole 28 is formed in the center of the inner annular portion 23. The rotatable shaft 13 is received through the rotatable shaft securing hole 28 of each core sheet 22. Sixteen teeth 25 are circumferentially arranged around the outer annular portion 24 at equal angular intervals and extend radially outward from the outer annular portion 24. A slot 30 is formed between each adjacent two teeth 25. Windings (not shown) are wound around the respective teeth 25. The windings are electrically connected to the metal plates 14*a* of the commutator 14. A salient pole 29 circumferentially extends from a distal end portion of each tooth 25 on both circumferential sides thereof. The salient poles 29 are arranged to radially oppose the magnets 18. An outer peripheral portion of the salient pole 29 is arcuately curved. Four window openings 26, which act as empty through holes, are placed in a space located between the inner annular portion 23 and the outer annular portion 24. With reference to FIG. 3A, the inner annular portion 23 is connected to the outer annular portion 24 through four stays 27. Each core sheet 22 is constructed to satisfy the following equation: $W1 \geq \pi \times D1/N1$, where "W1" is a width of each stay 27, "D1" is an outer diameter of the stays 27, and "N1" is the number of the slots 30.

With reference to FIGS. 2A to 3B, the core 21 is constructed by stacking the core sheets 22 in such a manner that the core sheets 22 are progressively displaced one after the other by an displacement angle of approximately 360 degrees/T1 in a direction of an arrow F1, where "T1" is the number of the teeth 25. In the present embodiment, the core 21 is constructed by stacking the core sheets 22 in such a manner that the core sheets 22 are successively displaced one after the other by a displacement angle of approximately 22.5 degrees in the direction of the arrow F1. Each core sheet 22 is displaced in the direction of the arrow F1, for example, by rotating the core sheet 22 about the rotatable shaft 13 in the direction of the arrow F1. With reference to FIG. 2B, the stays 27 of the core sheets 22 are stacked to form a stairstep-shaped guide walls 80, which spirally extend in an axial direction of the core 21, when the core sheets 22 are stacked in such a manner that the core sheets 22 are progressively displaced one after the other by the displacement angle of approximately 360 degrees/T1 in the direction of the arrow F1. Each stay 27 of one core sheet 22 is displaced from the corresponding stay 27 of the beneath core sheet 22 in a left direction in FIG. 2B. That is, end surfaces 27*a* of the stacked stays 27, which face toward the direction of the arrow F1, form a stairstep-like slanted contour that is slanted in a direction of air flow. Thus, a rotational direction (direction of the arrow F1) of the core 21 is selected such that the air is forced by the core 21 to flow toward the brush 15 side through the window openings 26 of the core 21. In other words, the rotational direction of the core 21 is selected such that the air is forced to flow from the second surface 21*b* side to the first surface 21*a* side of the core 21 through the window openings 26 of the core 21.

A way of restraining penetration of the brush powder into the bearing 31 will be described below.

First, the core 21 is rotated in the direction of the arrow F1. The core 21 acts like a fan, so that the air is forced to flow from the second surface 21*b* side to the first surface 21*a* side of the core 21. As a result, an air pressure within the motor housing 12 decreases, and thus the air is sucked into the motor housing 12 through the second housing openings 12*c*. Then, the air is expelled from the first surface 21*a* side of the core 21 and is guided toward the brush holding device 42 side. At the brush holding devices 42, the air carries the brush powder, which is generated from the brushes 15, away from the brush holding devices 42. After that, the air, which carries the brush powder, is expelled from the first housing openings 12*d* of the motor housing 12. In the above arrangement, the bearing 31 side of the core 21 is positioned on an upstream side of the air flow in the motor housing 12. Thus, the penetration of the brush powder into the bearing 31 is effectively restrained.

The above embodiment provides the following characteristic advantages.

(1) The air flows toward the brush 15 side through the window openings 26 when the core 21 rotates. Thus, the air is prevented from flowing toward the bearing 31 through the window openings 26. As a result, the air, which carries the brush powder, is effectively prevented from penetrating into the bearing 31. In this manner, it is not necessary to provide the dustproof cover 71 to the bearing 31, thereby preventing an increase in the number of required components of the direct current motor 11. Furthermore, the step of installing the dustproof cover 71 is not required. Also, the contact type seals 72, which are generally more expensive than the non-contact type seals 32, are not required at the bearing 31. Thus, it is possible to reduce the manufacturing cost of the direct current motor 11.

(2) The width W1 of each stay 27 is selected such that the stays 27 form the stairstep-shaped guide walls 80 when the core sheets 22 are stacked in such a manner that the core sheets 22 are progressively displaced one after the other by the predetermined displacement angle of approximately 360 degrees/T1 in the rotational direction of the core 21. Thus, the stays 27 can be stacked to form the stairstep-shaped guide walls 80 by stacking the core sheets 22 of the same type in the above manner.

(3) The motor housing 12 has the first housing openings, i.e., the air outlet openings 12*d* on the brush 15 side thereof. Because of this arrangement, the core 21 is placed in the middle of the air flow, so that the heat generated from the core 21 is cooled with the air that flows therethrough. Thus, the direct current motor 11 is forcefully cooled with the air, allowing achievement of higher output force and longer life time of the direct current motor 11. Furthermore, accumulation of the debris within the motor housing 12 can be prevented.

(4) In addition to the first housing openings, i.e., the air outlet openings 12*d*, the motor housing 12 also has the second housing openings, i.e., the air inlet openings 12c on the bearing 31 side thereof. Thus, the direct current motor is more effectively cooled with the air, allowing achievement of the higher output force and the longer life time of the direct current motor 11.

The above embodiment can be modified as follows.

Figure 4A:
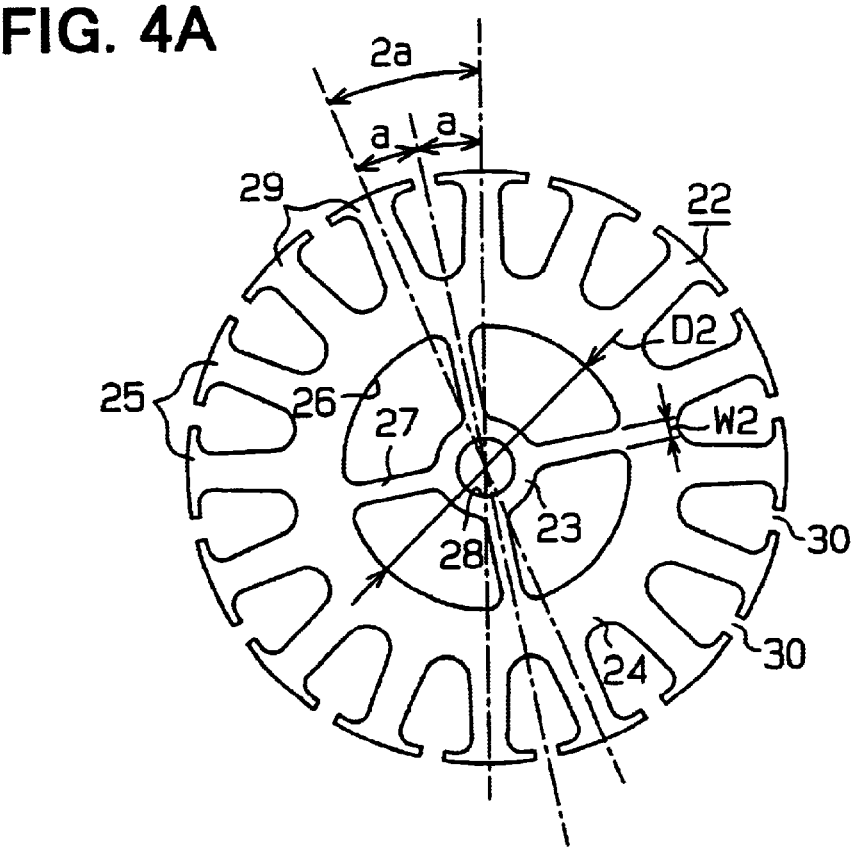
FIG. 4A is a plan view, showing a modification of the core sheet.
Figure 4B:
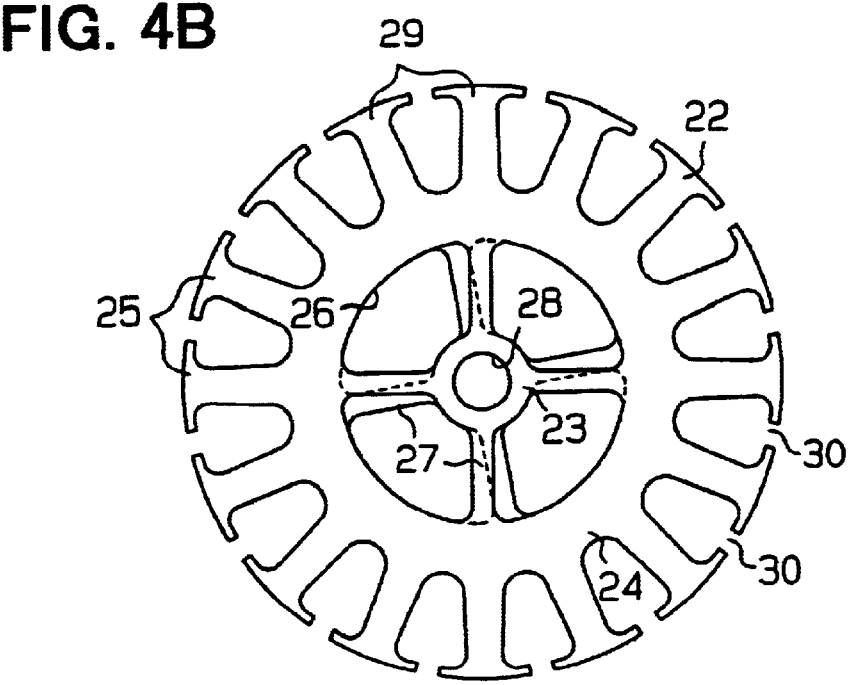
FIG. 4B is a plan view of stacked core sheets, each one of which is similar to one shown in FIG. 4A.

With reference to FIG. 4A, each core sheet 22 can be constructed to satisfy the following equation: W2≧π×D2/N2/n, where "W2" is a width of each stay 27, "D2" is an outer diameter of the stays 27, "n" is the number of types of the core sheets, and "N2" is the number of the slots 30. An angular distance "a" between a central axis of each stay 27 and a central axis of the adjacent tooth 25 is selected to satisfy the following equation: a=360 degrees/N2/n. With reference to FIG. 4B, the core sheets 22 of different types can be stacked in such a manner that the core sheets are progressively displaced one after the other by the angular distance "a" in the direction of the arrow F1. With this arrangement, the displacement between each stay 27 of one core sheet 22 and the corresponding stay 27 of the following core sheet 22 can be reduced in comparison to the motor where the core sheets 22 of the same type are stacked one after the other. Thus, the slanted stairstep-like contour, which is formed with the stays 27 of the different types of the core sheets 22, allows more effective air flow along it. Furthermore, since the stays 27 are stacked to form more smooth stairstep-like structure, more smooth air flow is achieved.

Figure 5:
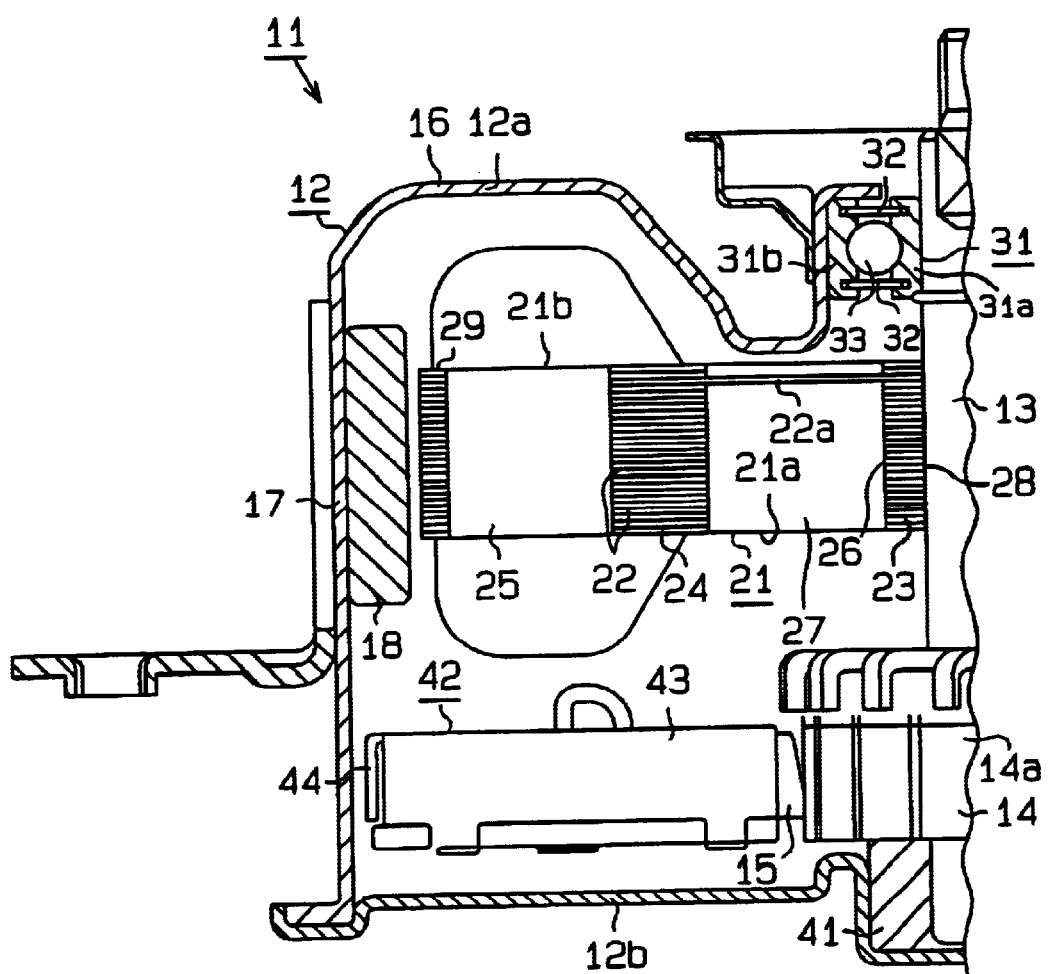
FIG. 5 is a partial cross-sectional view, showing a modification of the motor.
Figure 6:
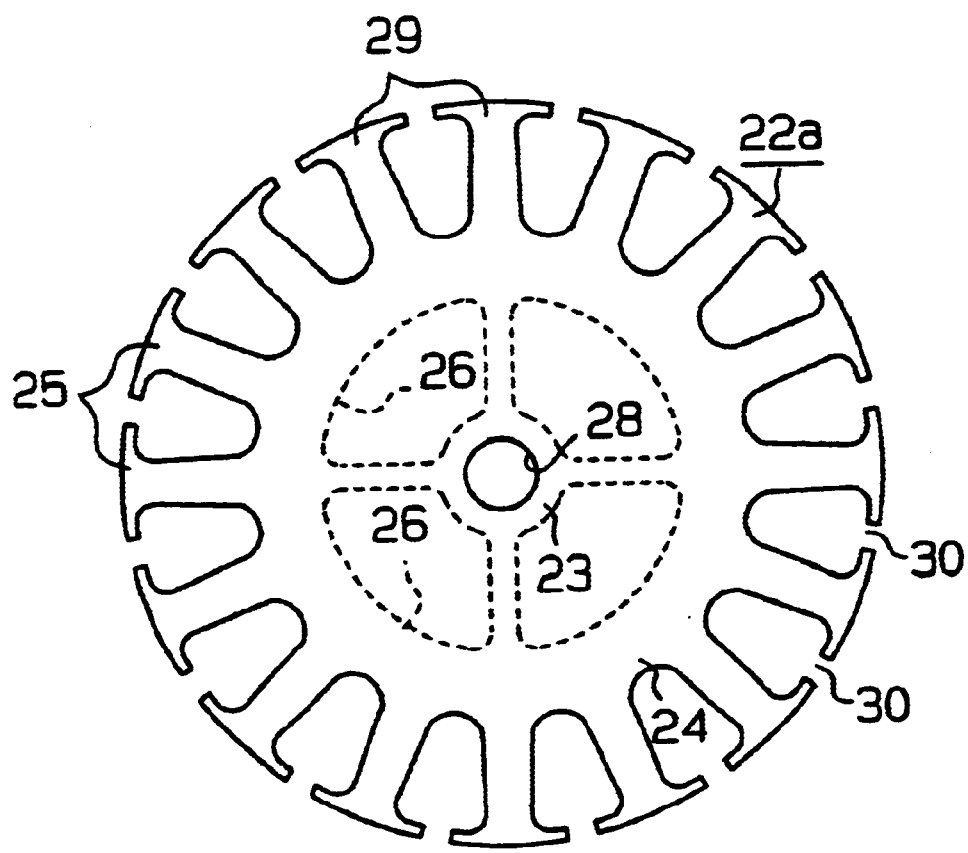
FIG. 6 is a plan view, showing a modification of the core sheet.

As shown in FIG. 5, one of the core sheets 22 can be replaced with a core sheet (closure core sheet) 22a that has no window opening 26, as shown in FIG. 6. Alternatively, two or more core sheets 22 can be replaced with the core sheets 22a that have no window opening 26. In this way, the window openings 26 of the core sheets 22 are closed by at least one core sheet 22a that has no window opening 26, so that the window openings 26 of the core sheets 22 do not allow communication of the air therethrough after the core 21 is assembled. Thus, the brush powder is effectively prevented from moving toward the bearing 31. As a result, the penetration of the brush powder into the bearing 31 can be effectively restrained. Furthermore, it is not required to stack the core sheets 22 in such a manner that the core sheets 22 are progressively displaced one after the other in the rotational direction of the core 21. Thus, it is not required to increase the number of molds for molding these core sheets 22. Also, if the window openings 26 of the core sheets 22 are formed through a step of punching out the window openings 26, the above arrangement allows elimination of that step. Thus, it is possible to prevent an increase in the manufacturing const of the direct current motor 11.

In the above embodiment, the second housing openings 12c are formed in the motor housing 12 on the bearing 31 side thereof, and the first housing openings 12d are formed in the motor housing 12 on the brush 15 side thereof. However, with respect to the second housing openings 12c and the first housing openings 12d, at least the second housing openings (i.e., the air inlet openings) 12c can be eliminated.

(Second Embodiment)

A second embodiment of the present invention will be described with reference to FIGS. 7A to 8B. The components similar to those discussed in the above embodiment will be identified with the same numerals and will not be discussed in details.

The core 21 includes a plurality of stacked core sheets 22, each one of which is made of a thin steel plate. A first surface (first axial end surface or one surface) 241 of each core sheet 22 faces downward in FIG. 1, and a second surface (second axial end surface or the other surface that is opposed to the one surface) 242 of the core sheet 22 faces upward in FIG. 1. The core sheets 22 are stacked together in such a manner that the first surface 241 of each core sheet 22 is opposed to the second surface 242 of the next core sheet 22.

As shown in FIGS. 7A to 8B, each core sheet 22 includes an inner annular portion 23 and an outer annular portion 24. A circular rotatable shaft securing hole 28 penetrates through the center of the inner annular portion 23. The rotatable shaft 13 is received through the rotatable shaft securing hole 28 of each core sheet 22. A plurality (sixteen in this embodiment) of teeth 25 are circumferentially arranged around the outer annular portion 24 at equal angular intervals (22.5 degree intervals) and extend radially outward from the outer annular portion 24. A slot 30 is formed between each adjacent two teeth 25. Windings (not shown) are wound around the respective teeth 25. The windings are electrically connected to the commutator 14. A salient pole 29 circumferentially extends from a distal end portion of each tooth 25 on both circumferential sides thereof. The salient poles 29 are arranged to radially oppose the magnets 18.

The inner annular portion 23 is connected to the outer annular portion 24 through three stays (first to third stays) 249–251. The first to third stays 249–251 are identical in shape and size and are arranged at equal angular intervals (120 degree intervals). The first to third stays 249–251 are arranged in this order in a clockwise direction when they are seen from the second surface 242 side of the core sheet 22. The first to third stays 249–251 define three window openings 26 in a space between the inner annular portion 23 and the outer annular portion 24. The first to third stays 249–251 of some core sheets 22 are not shown in FIG. 7A for the sake of clarity.

In the core 21, the teeth 25 of one core sheet 22 are stacked over the corresponding teeth 25 of the previous core sheet 22, respectively, in the axial direction of the core 21, so that the slots 30 of the one core sheet 22 are aligned with the slots 30 of the previous core sheet 22 in the axial direction of the core 21. This axial alignment of the slots 30 allows an easy winding operation of the windings around the teeth 25. Once the teeth 25 of all the core sheets 22 are stacked together in the axial direction of the core 21, the first to third stays 249–251 of the core sheets 22 are stacked to form stairstep-shaped guide walls 80, along which the air is guided and is forced to flow from the second surface 21b toward the first surface 21a through the window openings 26 when the direct current motor 11 is operated to rotate the core 21 together with the rotatable shaft 13 in a predetermined direction (direction of the arrow F1 in FIGS. 7A and 7B). Each stay 249–251 has a predetermined width that is determined in such a manner that a gap is eliminated between each vertically adjacent two stays 249–251 when they are stacked together.

The outer annular portion 24 of each core sheet 22 has three recesses (first to third recesses) 261–263 and a through hole (acts as a receiving portion) 258, which are all arranged along a concentric circle that is concentric to a rotational axis of the rotatable shaft 13 in this order in the clockwise direction in the second surface 242 of the core 22 when they are see from the second surface 242 side of the core sheet 22. The first to third recesses 261–263 are identical in shape and size. An angular interval between the first recess 261 and the second recess 262, an angular interval between the second recess 262 and the third recess 263, and an angular interval between the third recess 263 and the through hole 258 are all set to 112.5 degrees. The value of 112.5 degrees is obtained through the following equation: (360 degrees—the angular interval of the teeth)/the number of the stays. In this embodiment, the value of 112.5 degrees is obtained through the following equation: (360 degrees—22.5 degrees (i.e., angular interval of the teeth 25))/3 (i.e., the number of the stays 249–251). An angular interval between the through hole 258 and the first recess 261 is 22.5 degrees. The outer annular portion 24 of each core sheet 22 also has first to third projections 255–257 that are arranged in the first surface 241 of the core sheet 22. The first to third projections 255–257 are opposed to the first to third recesses 261–263 of the core sheet 22 in the axial direction of the core 21, respectively.

Figure 7A:
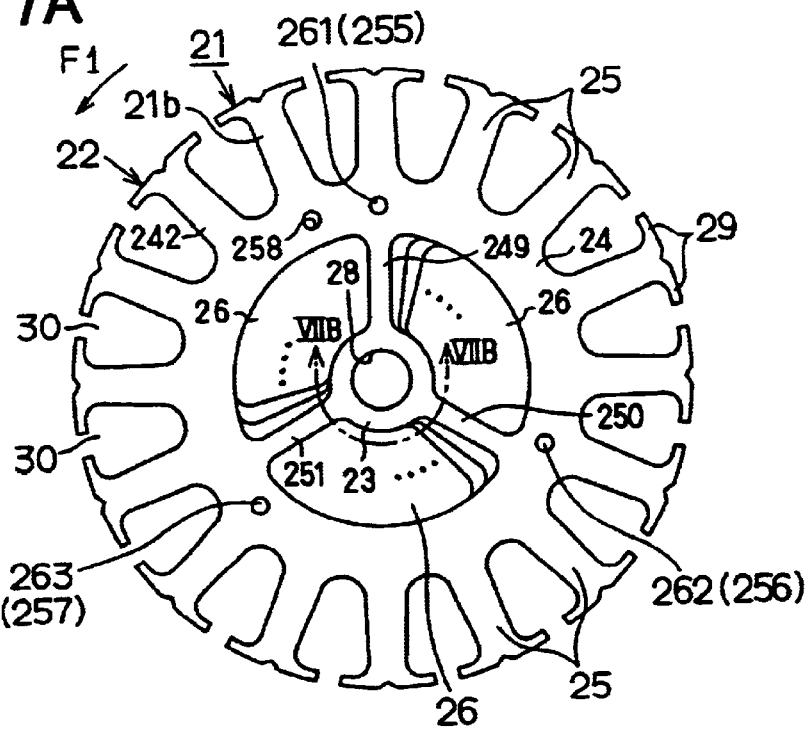
FIG. 7A is a schematic view of a core according to a second embodiment, seen from a second surface side of the core.
Figure 7B:
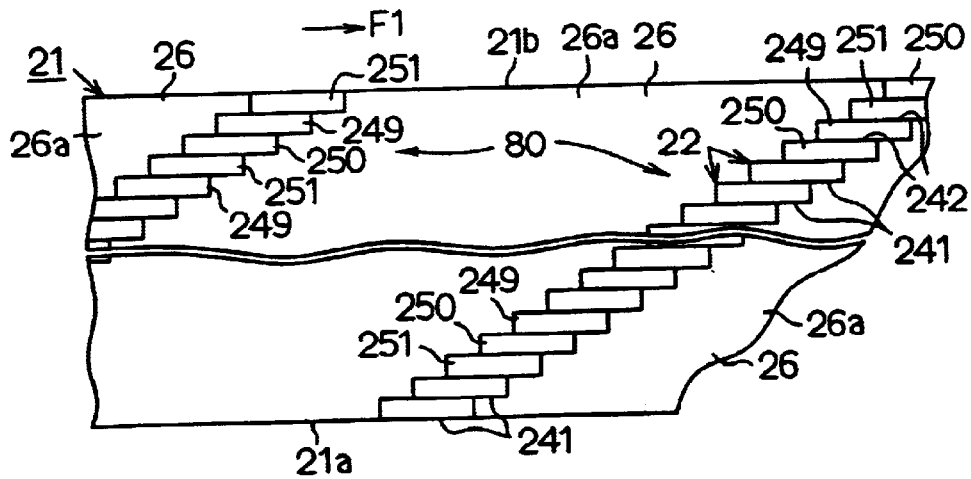
FIG. 7B is a schematic partial cross sectional view taken along line VIIB—VIIB in FIG. 7A.
Figure 7C:
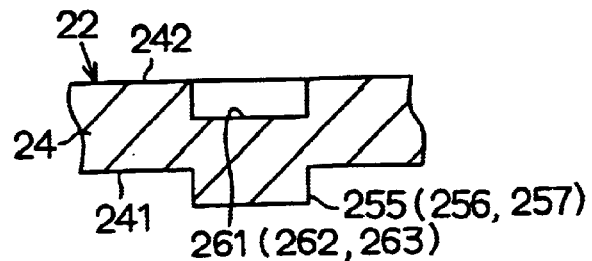
FIG. 7C is an enlarged schematic partial cross-sectional view of the core sheet according to the second embodiment, showing a projection and a recess of the core sheet.

With reference to FIG. 7C, the first to third recesses 261–263 and the first to third projections 255–257 are formed in the following manner. That is, when the first to third recesses 261–263 are formed in the second surface 242 of the core sheet 22 by pressing the corresponding portions of the second surface 242, the first to third projections 255–257 are simultaneously formed to protrude from the first surface 241. The first to third recesses 261–263 of one core sheet 22 are arranged to engage with the first to third projections 255–257 of the other core sheet 22. The through hole 258 of the core sheet 22 has the same size as that of the first to third recesses 261–263, so that the through hole 258 of one core sheet 22 can engage with any one of the first to third projections 255–257 of the other core sheet 22.

In this embodiment, the first stay 249 and the first projection 255 are positioned along a central axis of one particular tooth 25 in each core sheet 22. In other words, a circumferential center of the first stay 249 and a circumferential center of the first recess 261 are aligned with a circumferential center of one of the teeth 25 in a radial direction of the core sheet 22.

A method for stacking the above core sheets 22 to form the core 21 will be described.

Figure 8A:
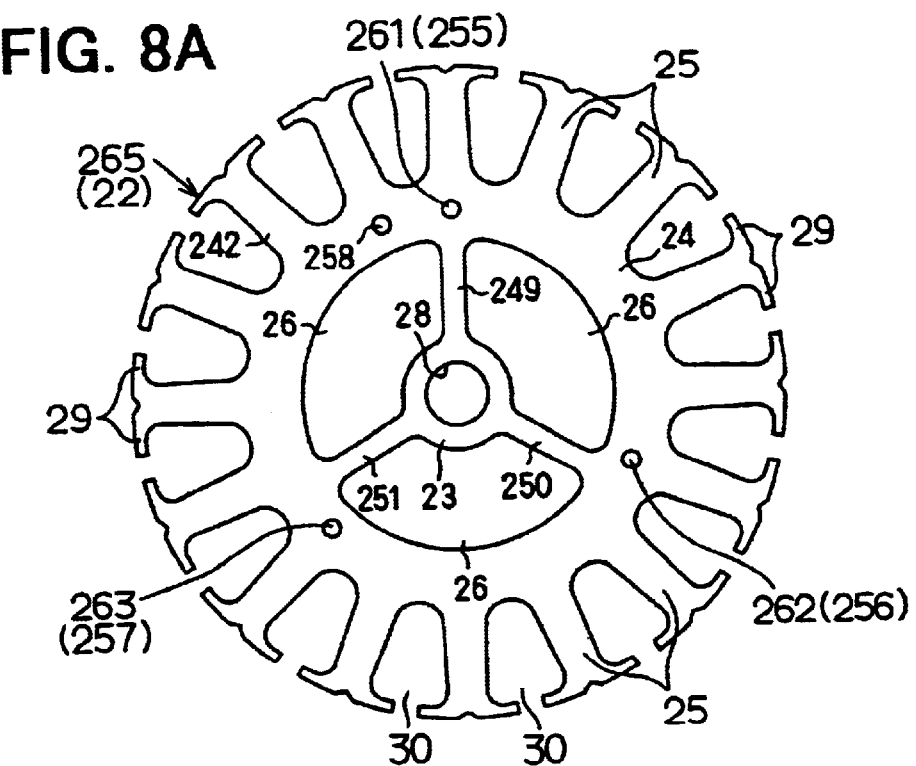
FIG. 8A is a schematic view of the core sheet according to the second embodiment seen from a second surface side of the core sheet.

First, as shown in FIG. 8A, one core sheet is provided. The second surface 242 of the initial core sheet is opposed to the first surface 241 of the following second core sheet. In the following description, the initial core sheet will be referred to as a first core sheet 265, and the following second core sheet will be referred to as a second core sheet 266.

Figure 8B:
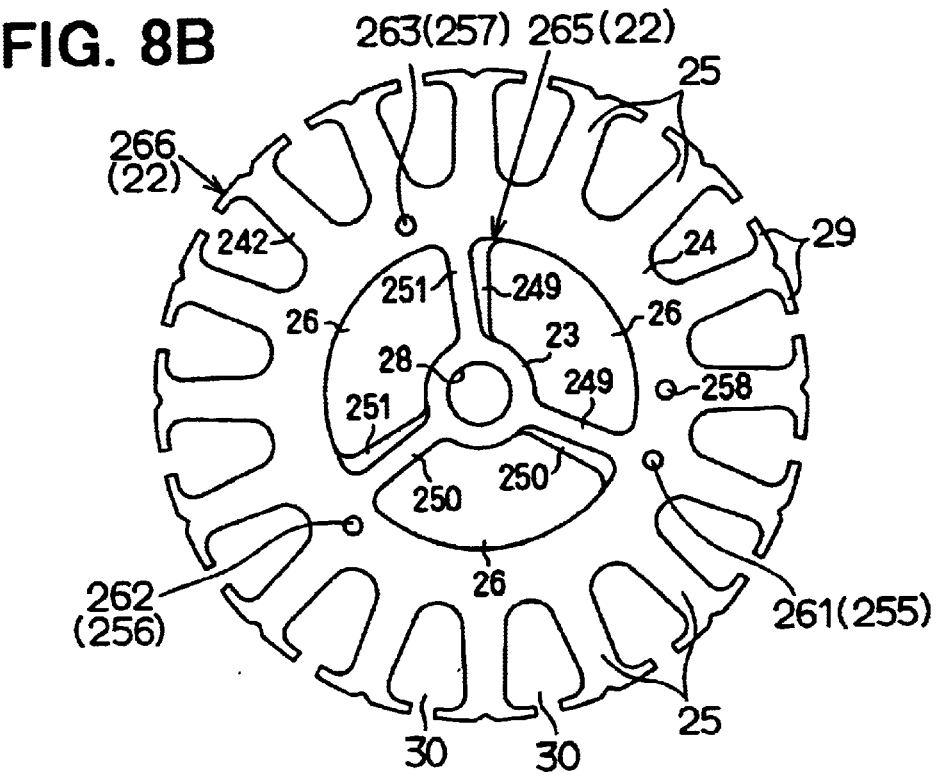
FIG. 8B is a schematic view, showing two stacked core sheets, each one of which is similar to one shown in FIG. 8A.

Then, as shown in FIG. 8B, the second core sheet 266 is rotated by 112.5 degrees with respect to the first core sheet 265 in the clockwise direction when they are seen from the second surface 242 side of the second core sheet 266. Thus, the first to third projections 255–257 of the second core sheet 266 are engaged with the second recess 262, the third recess 263 and the through hole 258 of the first core sheet 265, respectively. As a result, the first surface 241 of the second core sheet 266 abuts the second surface 242 of the first core sheet 265. The first stay 249 of the second core sheet 266 is stacked over the second stay 250 of the first core sheet 265 such that the first stay 249 of the second core sheet 266 is displaced by 7.5 degrees with respect to the second stay 250 of the first core sheet 265 in a counterclockwise direction. Similarly, the second and third stays 250, 251 of the second core sheet 266 are stacked over the third and first stays 251, 249 of the first core sheet 265, respectively, such that the second and third stays 250, 251 of the second core sheet 266 are displaced by 7.5 degrees with respect to the third and first stays 251, 249 of the first core sheet 265, respectively, in the counterclockwise direction.

Similarly, the first surface 241 of the third core sheet is opposed to the second surface 242 of the second core sheet 266. Then, the third core sheet is rotated by 112.5 degrees with respect to the second core sheet 266 in the clockwise direction. Thus, the first to third projections 255–257 of the third core sheet are engaged with the second recess 262, the third recess 263 and the through hole 258 of the second core sheet 266, respectively. The first to third stays 249–251 of the third core sheet are stacked over the second, third and first stays 250, 251, 249 of the second core sheet 266, respectively, such that the first to third stays 249–251 of the third core sheet are displaced by 7.5 degrees with respect to the second, third and first stays 250, 251, 249 of the second core sheet 266, respectively, in the counterclockwise direction.

In a manner similar to that discussed above, the fourth core sheet and the rest of the core sheets are stacked one after the other by rotating each core sheet by 112.5 degrees with respect to the previous core sheet in the clockwise direction and engaging the projections with the corresponding recesses and through hole, respectively. After a predetermined number of the core sheets are stacked together, the core 21 is formed. During the above stacking process, the adjacent core sheets 22 are preferably secured together at any timing by press fitting the projections and the corresponding recesses and through holes of the adjacent core sheets 22. For example, after one or two (or more) core sheets 22 are stacked over one core sheet 22, these core sheets 22 can be secured by press fitting the projections and the corresponding recesses and through holes of these core sheets 22.

Operation of the direct current motor constructed in the above manner will be described.

When the direct current motor 11 is operated, and thereby the rotatable shaft 13 is rotated to rotate the core 21 in the direction of the arrow F1, the first to third stays 249–251 will act like a fan. Thus, the air is forced to flow from the second surface 21*b* side to the first surface 21*a* side of the core 21 along the guide walls 80. As a result, the air is introduced from the second housing openings 12*c* and is discharged from the first housing openings 12*b*, so that the direct current motor 11 is cooled with the air flow.

The above embodiment provides the following advantages.

(5) In one type of core sheet 22, the first to third projections 255–257 and through hole 258 are formed at the predetermined angular intervals. Thus, the first to third stays 249–251 of each adjacent two core sheets 22 can be stacked together to form the stairstep-shaped guide walls 80 for guiding the air by rotating the upper core sheet 22 by the predetermined angle with respect to the lower core sheet 22 (i.e., placing the upper core sheet 22 at a second angular position of the present invention with respect to the lower core sheet 22) and engaging the first to third projections 255–257 of the upper core sheet 22 with the second recess 262, third recess 263 and through hole 258 of the lower core sheet 22, respectively. As a result, the guide walls 80 for guiding the air is formed in the core 21 without requiring any other type of core sheet and also without increasing the number of the components.

(6) Each adjacent two core sheets 22 are positioned with respect to each other by engaging the first to third projections 255–257 of the upper core sheet 22 with the second, third recesses 262, 263 and through hole 258 of the lower core sheet 22, respectively. Thus, when the adjacent core sheets 22 are stacked together by rotating the upper core sheet 22 with respect to the lower core sheet 22, the relative positioning of these core sheets 22 is eased.

(7) The first to third projections 255–257 of the upper core sheet 22 are engaged with the second recess 262, the third recess 263 and through hole 258 of the lower core sheet 22, respectively, so that the shape of the core 21 can be maintained without requiring any other means, allowing easier assembly of the core 21. The adjacent core sheets 22 are secured to each other by press fitting the projections 255–257, so that any other securing means, such as an adhesive or other engaging structure, is not required, allowing improvement in the assembly of the core.

(8) the above steps of forming the projections, through hole and recesses in the core sheet, rotating the core sheet for engaging the projections with the corresponding through hole and recesses, stacking the core sheets together, and press fitting of the projections can be relatively easily accomplished using preexisting rotating and press fitting techniques.

(Third Embodiment)

A third embodiment of the present invention will be described with reference to FIGS. 9A and 9B. In this embodiment, the number of the stays, the number of the projections, the number of the recesses, the intervals of the projections, and the intervals of the recesses differ from those of the above embodiment. The components similar to those discussed in the above embodiment will be identified with the same numerals and will not be discussed in details.

Figure 9A:
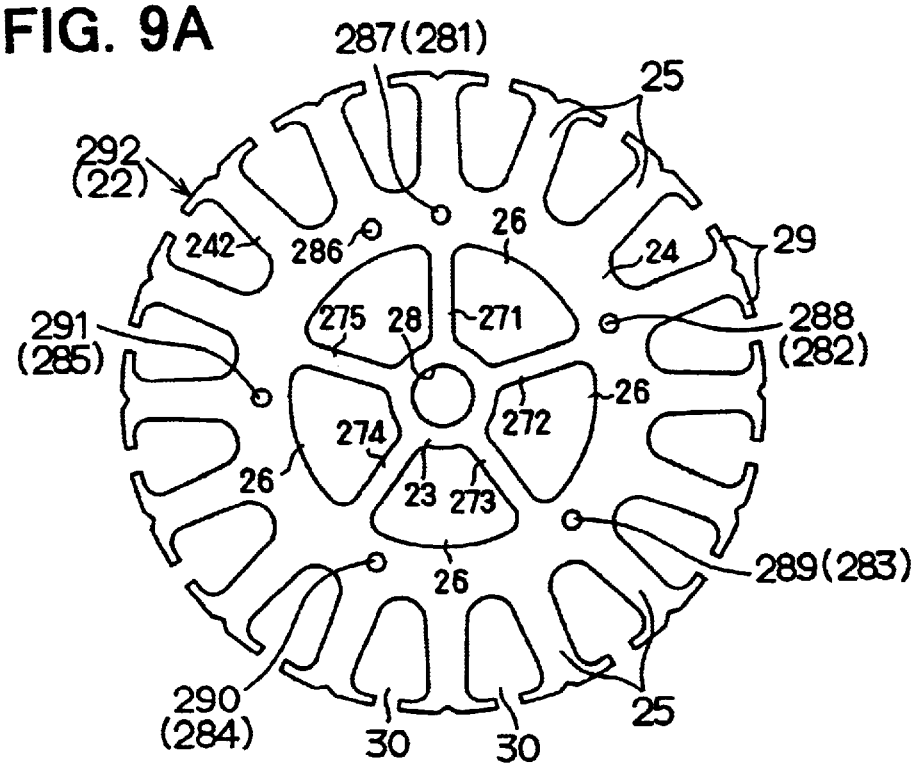
FIG. 9A is a schematic view of a core sheet according to a third embodiment of the present invention, seen from a second surface side of the core sheet.

As shown in FIG. 9A, in the core sheet 22 according to the present embodiment, the inner annular portion 23 is connected to the outer annular portion 24 through five stays (first to fifth stays) 271–275. The first to fifth stays 271–275 are identical in shape and size. When the core sheet 22 is seen from the second surface (opposite surface with respect to the one surface) 242, the first to fifth stays 271–275 are arranged in this order at equal angular intervals (72 degree intervals) in the clockwise direction. In a space located between the inner annular portion 23 and the outer annular portion 24, five window openings 26 are defined by the first to fifth stays 271–275.

The outer annular portion 24 of each core sheet 22 has five recesses (first to fifth recesses) 287–291 and a through hole (acting as a receiving portion) 286, which are all arranged along the concentric circle in this order in the clockwise direction in the second surface 242 of the core 22 when they are see from the second surface 242 side of the core sheet 22. The first to fifth recesses 287–291 are identical in shape and size. An angular interval between the first recess 287 and the second recess 288, an angular interval between the second recess 288 and the third recess 289, an angular interval between the third recess 289 and the fourth recess 290, an angular interval between the fourth recess 290 and the fifth recess 291, and an angular interval between the fifth recess 291 and the through hole 286 are all set to 67.5 degrees. Similar to the second embodiment, the value of 67.5 degrees is obtained through the following equation: (360 degrees– the angular interval of the teeth)/the number of the stays. In this embodiment, the number of the stays is changed from three to five, so that the value of 67.5 degrees is obtained through the following equation: (360 degrees–22.5 degrees (i.e., angular interval of the teeth 25))/5 (i.e., the number of the stays 271–275). The interval between the through hole 286 and the first through hole 287 is 22.5 degrees. The outer annular portion 24 of each core sheet 22 also has first to fifth projections 281–285 that are arranged in the first surface 241 of the core sheet 22. The first to fifth projections 281–285 are opposed to the first to fifth recesses 287–291 of the core sheet 22 in the axial direction of the core 21, respectively. The first to fifth recesses 287–291, which correspond to the first to fifth projections 281–285, and the through hole 286 are engageable with the first to fifth projections 281–285 of the other core sheet 22.

In the process of stacking the core sheets 22, the first surface of the second core sheet (second core sheet) 293 is opposed to the second surface 242 of the initial core sheet (first core sheet) 292 shown in FIG. 9A.

Figure 9B:
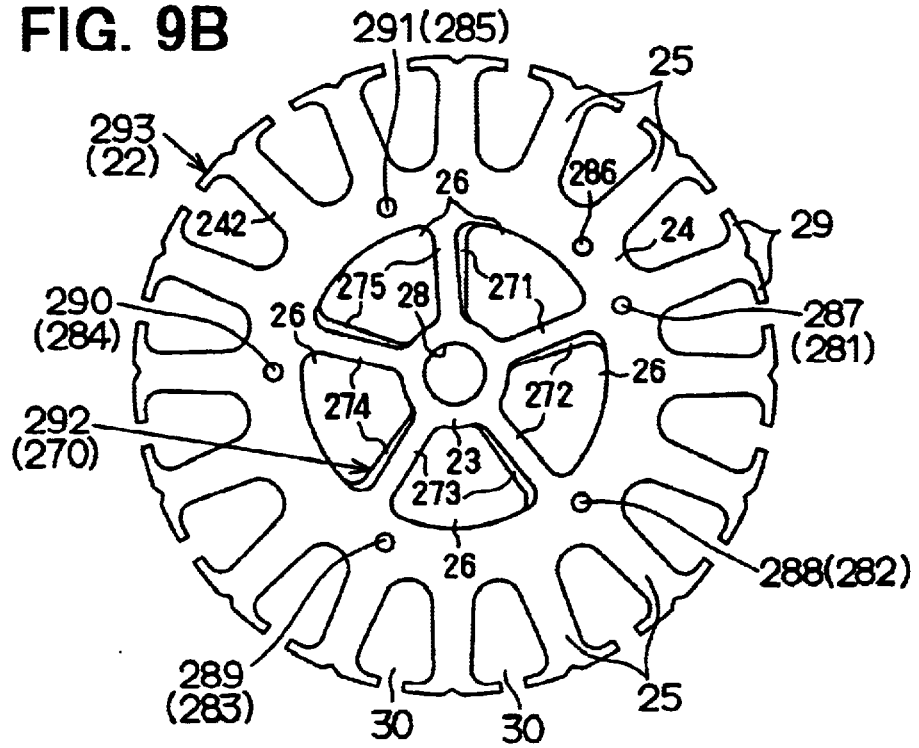
FIG. 9B is a schematic view of two stacked core sheets, each of which is similar to one shown in FIG. 9A.

Next, as shown in FIG. 9B, the second core sheet 293 is displaced or rotated by 67.5 degrees with respect to the first core sheet 292 in the clockwise direction when these core sheets 292, 293 are seen from the second surface 242 side of the second core sheet 293. Thus, the first to fifth projections 281–285 of the second core sheet 293 are engaged with the second to fifth recesses 288–291 and through hole 286 of the first core sheet 292, respectively, and the first surface of the second core sheet 293 abuts the second surface 242 of the first core sheet 292. The first to fifth stays 271–275 of the second core sheet 293 are displaced by 4.5 degrees with respect to the second stay to fifth stays 272–275 and first stay 271 of the first core sheet 292, respectively, in the counterclockwise direction.

The third core sheet and the rest of the core sheets are stacked in a manner similar to that described above. That is, the next core sheet is rotated by 67.5 degrees with respect to the previous core sheet in the clockwise direction, and the first to fifth projections 281–285 of the next core sheet are engaged with the second to fifth recesses 288–291 and through hole 286 of the previous core sheet, respectively, so that the next core sheet is stacked over the previous core sheet. When the core, which is constructed in the above manner, is rotated in the counterclockwise direction in FIGS. 9A and 9B upon operation of the direct current motor, the air flows from the second surface side to the first surface side of the core through the guide portions defined by the first to fifth stays 271–275, so that the direct current motor is cooled with the air.

According to the above embodiment, in addition to the advantages described in the above sections (6)–(8) of the second embodiment, the following advantages are also achieved.

(9) The first to fifth projections 281–285 and the through hole 286 are arranged in each core sheet 22 at the predetermined angular intervals (67.5 degree intervals). Thus, through the steps of rotating the core sheet 22 by the predetermined angle with respect to the previous core sheet, and engaging the first to fifth projections 281–285 of the next core sheet to the second to fifth recesses 288–291 and through hole 286 of the previous core sheet, the first to fifth stays 271–275 of the core sheets 22 are stacked in such a manner that each stay of the next core sheet is displaced by 4.5 degrees with respect to the corresponding stay of the previous core sheet to form the guide walls for guiding the air. Thus, although the five stays are provided, the guide walls for guiding the air through the core can be formed without requiring another type of core sheet and without increasing the number of components.

(Fourth Embodiment)

A fourth embodiment of the present invention will be described with reference to FIGS. 10A and 10B. In this embodiment, the number of the stays, the number of the projections, the number of the recesses, the intervals of the projections, and the intervals of the recesses differ from those of the above embodiments. The components similar to those discussed in the above embodiments will be identified with the same numerals and will not be discussed in details.

Figure 10A:
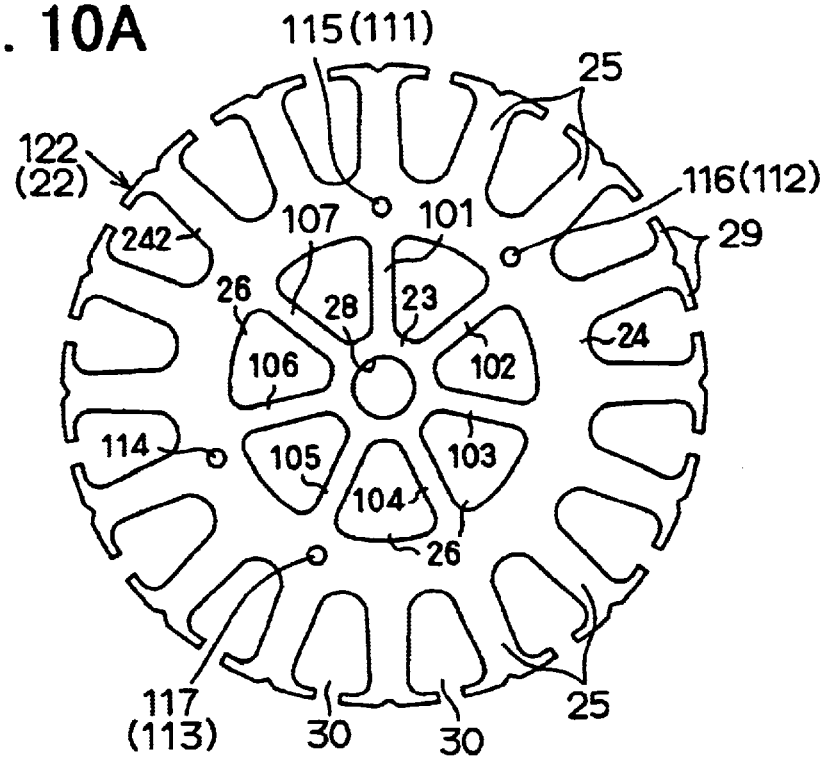
FIG. 10A is a schematic view of a core sheet according to a fourth embodiment of the present invention, seen from a second surface side of the core sheet.

As shown in FIG. 10A, in the core sheet 22 according to the present embodiment, the inner annular portion 23 is connected to the outer annular portion 24 through seven stays (first to seven stays) 101–107. The first to seven stays 101–107 are arranged in this order at equal angular intervals (360 degrees/7=about 51.4 degree intervals) in the clockwise direction when the core sheet 22 is seen from a second surface (opposite surface with respect to the one surface) 242 of the core sheet 22. In a space located between the inner annular portion 23 and the outer annular portion 24, seven window openings 26 are defined by the first to seven stays 101–107.

The outer annular portion 24 of each core sheet 22 has three recesses (first to third recesses) 115–117 and a through hole (acting as a receiving portion) 114, which are all arranged along the concentric circle in this order in the clockwise direction in the second surface 242 of the core 22 when they are see from the second surface 242 side of the core sheet 22. The first to third recesses 115–117 are identical in shape and size. An angular interval between the first recess 115 and the third recess 117, an angular interval between the third recess 117 and the second recess 116, and an angular interval between the second recess 116 and the through hole 114 are all set to 202.5 degrees in the clockwise direction. Thus, an angular interval between the first recess 115 and the second recess 116 and an angular interval between the third recess 117 and the through hole 114 are all set to 45 degrees. Furthermore, an angular interval between the second recess 116 and the third recess 117 is set to 157.5 degrees. An angular interval between the through hole 114 and the first recess 115 is set to 112.5 degrees. The outer annular portion 24 of each core sheet 22 also has first to third projections 111–113 that are arranged in the first surface 241 of the core sheet 22. The first to third projections 111–113 are opposed to the first to third recesses 115–117 of the core sheet 22 in the axial direction of the core 21, respectively. The first to third recesses 115–117, which correspond to the first to third projections 111–113, and the through hole 114 are engageable with the first to third projections 111–113 of the other core sheet 22.

In the process of stacking the core sheets 22, the first surface of the second core sheet (second core sheet) 123 is opposed to the second surface 242 of the initial core sheet (first core sheet) 122 shown in FIG. 10A.

Figure 10B:
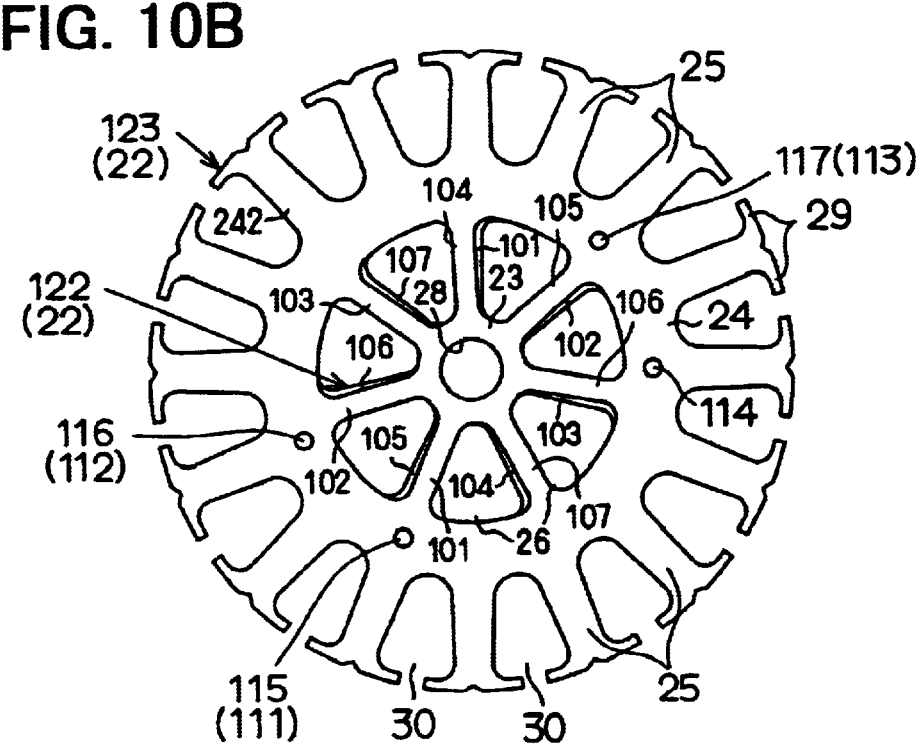
FIG. 10B is a schematic view of two stacked core sheets, each of which is similar to one shown in FIG. 10A.
Figure 11:
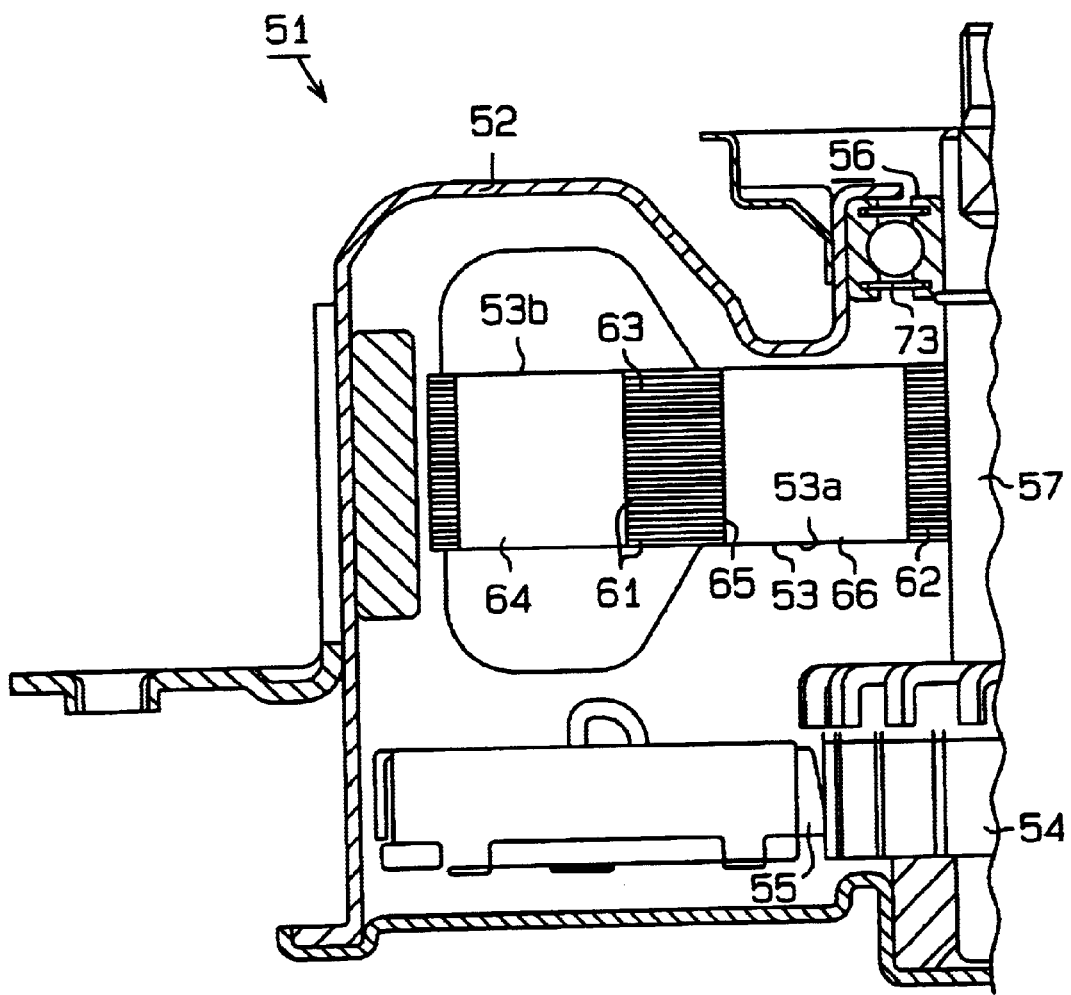
FIG. 11 is a partial cross-sectional view of a previously proposed motor.
Figure 12A:
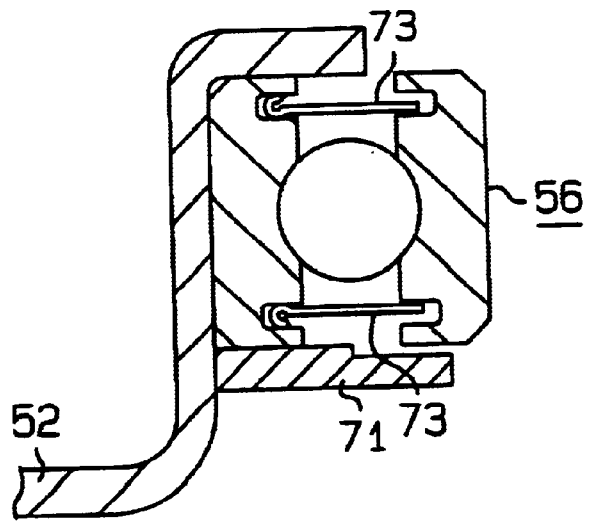
FIG. 12A is an enlarged schematic partial view showing a bearing of the previously proposed motor.
Figure 12B:
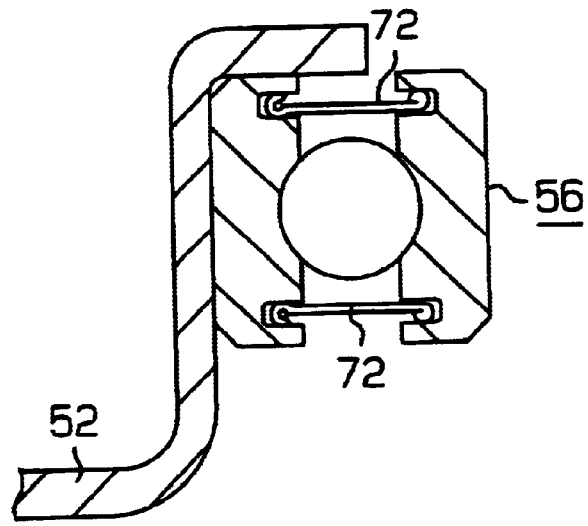
FIG. 12B is another enlarged schematic partial view showing another type of bearing of the previously proposed motor.

Next, as shown in FIG. 10B, the second core sheet 123 is displaced or rotated by 202.5 degrees with respect to the first core sheet 122 in the clockwise direction when the core sheets 122, 123 are seen from the second surface 242 side of the second core sheet 123. Thus, the first to third projections 111–113 of the second core sheet 123 are engaged with the third recess 117, the through hole 114 and the second recess 116 of the first core sheet 122, respectively. The first surface of the second core sheet 123 abuts the second surface 242 of the first core sheet 122. The first to seventh stays 101–107 of the second core sheet 123 are displaced by about 3.2 degrees with respect to the fifth to seventh and first to fourth stays 105–107, 101–104 of the first core sheet 122, respectively, in the counterclockwise direction.

The third core sheet and the rest of the core sheets are stacked in a manner similar to that described above. That is, the next core sheet is rotated by 202.5 degrees with respect to the previous core sheet in the clockwise direction, and the first to third projections 111–113 of the next core sheet are engaged with the third recess 117, through hole 114 and second recess 116 of the previous core sheet, respectively, so that the next core sheet is stacked over the previous core sheet. When the core, which is constructed in the above manner, is rotated in the counterclockwise direction in FIGS. 10A and 10B upon operation of the direct current motor, the air flows from the second surface side to the first surface side of the core through the guide portions defined by the first to seventh stays 101–107, so that the direct current motor is cooled with the air.

According to the above embodiment, in addition to the advantages described in the above sections (6)–(8) of the above embodiment, the following advantages are also achieved.

(10) In one type of core sheet 22, the first to third projections 111–113 and through hole 114 are formed at the predetermined angular intervals. Thus, through the steps of rotating the core sheet 22 by the predetermined angle and engaging the first to third projections 111–113 of the next core sheet to the recess 117, through hole 114 and recess 116 of the previous core sheet, the first to seventh stays 101–107 of the adjacent core sheets are stacked in such a manner that each stay of the next core sheet is displaced by about 3.2 degrees with respect to the corresponding stay of the previous core sheet in the counterclockwise direction to form the guide walls for guiding the air. Thus, although the seven stays are provided, the guide walls for guiding the air through the core can be formed without requiring another type of core sheet and without increasing the number of components.

The invention is not limited to the above embodiments, and the above embodiments can be modified as follows.

The rotatable shaft 13 can be rotated in the direction opposite to the direction discussed in each of the above embodiments. In this way, the core 21 rotates in the direction opposite to the direction of the arrow F1, and the air flows in the opposite direction from the first surface side 21a to the second surface 21b side of the core 21 along the guide walls 80 because of the first to third stays 249–251 that act like the fan. Thus, the first housing openings 12d now act as the air inlet openings for taking the air therethrough, and the second housing openings 12c now act as the air outlet openings for expelling the air therethrough.

In the second embodiment, when the core sheet 22 is seen from the second surface 242 side thereof, the first to third projections 255–257 and through hole 258 are arranged in this order at the predetermined angular intervals in the clockwise direction. Alternatively, the first to third projections 255–257 and the through hole 258 can be arranged in this order at the predetermined angular intervals in the opposite direction, i.e., the counterclockwise direction. In this case, in the process of stacking the core sheets, if the next core sheet is rotated by 112.5 degrees in the counterclockwise direction with respect to the previous core sheet, the first to third projections of the next core sheet are engaged with the second recess, third recess and through hole of the previous core sheet. Furthermore, the first to third stays of the next core sheet are displaced by 7.5 degrees with respect to the second stay, third stay and first stay of the previous core sheet, respectively, in the clockwise direction. When the rotatable shaft, to which the core is secured, is rotated in the same direction (direction of F1 in FIGS. 7A and 7B) as that of the second embodiment, the air flows from the first surface 21a side to the second surface 21b side of the core 21. Similarly, if the projections and hole, which are arranged in the clockwise direction in the second or fourth embodiment, are arranged in the opposite direction, i.e., in the counterclockwise direction, the air flows from the first surface 21a side to the second surface 21b side of the core 21 when the rotatable shaft 13 is rotated in the same direction as that of the second or fourth embodiment. As described above, the direction of the air flow varies according to the direction of the displacement of the core sheets, so that the desired direction of the air flow can be achieved by selecting the direction of the displacement of the core sheets.

It is possible to eliminate the first and second projections 255, 256 from each core sheet 22, so that each core sheet 22 only has the through hole 258 and third projection 257. Even with this arrangement, by rotating the next core sheet by 112.5 degrees with respect to the previous core sheet and engaging the third projection 257 of the next core sheet to the through hole 258 of the previous core sheet, the first to third stays 249–251 of these core sheets are stacked to form the guide walls. Thus, the guide walls for guiding the air through the core can be formed.

Also, it is possible to eliminate the first projection 255 from each core sheet 22, so that each core sheet 22 only has the through hole 258, third projection 257 and second projection 256. Even with this arrangement, by rotating the next core sheet by 112.5 degrees with respect to the previous core sheet and engaging the second and third projections 256, 257 of the next core sheet to the third recess 263 and through hole 258 of the previous core sheet, respectively, the first to third stays 249–251 of these core sheets are stacked to form the guide walls for guiding the air. Thus, the guide walls for guiding the air through the core can be formed.

It is also possible to eliminate the first to fourth projections 281–284 from each core sheet 22, so that each core sheet 22 only has the through hole 286 and fifth projection 285.

Furthermore, it is possible to eliminate the first to third projections 281–283 from the core sheet 22, so that each core sheet 22 only has the through hole 286, fifth projection 285 and fourth projection 284.

It is also possible to eliminate the first and second projections 281, 282 from each core sheet 22, so that each core sheet 22 only has the through hole 286 and third to fifth projections 283–285.

It is also possible to eliminate the first projection 281 from each core sheet 22, so that each core sheet only has the through hole 286 and second to fifth projections 282–285.

It is also possible to eliminate the first and third projections 111, 113 from each core sheet 22, so that each core sheet 22 only has the through hole 114 and second projection 112.

It is also possible to eliminate the first projection 111 from each core sheet 22, so that each core sheet 22 only has the through hole 114, second projection 112 and third projection 113.

A cross section of each stay is not required to have the rectangular shape, and the stays are not required to be stacked in the stairstep-like structure. For example, the cross-section of each stay can be a parallelogram, and the stays can be stacked one after the other to form a smooth slanted surface.

It is not required to provide the first recess 261, 287, 115, to which the projection can be engaged, on the side opposite to the first projection 255, 281, 111. In the process of stacking the core sheets, the projections of the next core sheet are not opposed to the opposite side of the first projection 255, 281, 111 of the previous core sheet and are engaged with the other recesses and the through hole of the previous core sheet. Thus, even in this case, the core sheets can be stacked in a manner similar to that described above.

It is not required to form the projections, hole and recesses in the outer annular portion of the core sheet. The projections, hole and recesses can be arranged along the concentric circle located, for example, in the inner annular portion or teeth.

All the core sheets are not required to be stacked in such a manner that the core sheets are progressively displaced one after the other by the predetermined angle. For example, as long as each guide wall guides the air along it upon the rotation of the rotatable shaft, it is not necessary to displace some of the core sheets located on the air outlet opening side. Alternatively, the core sheets can be divided into several groups. In each group, the core sheets are stacked together without displacement (e.g., the first to third projections 255–257 of one of each two adjacent core sheets 22 are engaged with the first to third recesses 261–263 of the other one of the two adjacent core sheets 22, respectively). Thus, the through holes (receiving portions) of these core sheets are aligned in the axial direction of the core (i.e., each one of the core sheets is placed at a first angular position of the invention). Then, these groups can be progressively displaced one after the other by the predetermined displacement angle.

Each receiving portion is not necessarily the through hole 258, 286, 114. For example, the receiving portion can be a recess or blind hole, which is formed in the second surface 242 of the core sheet 22 and is capable of engaging with the projection. In such a case, a portion of the first surface 241 of the core sheet 22, which opposes the blind hole in the axial direction of the core 21, need to be flat.

The number of the stays would not necessarily be the odd number and can be an even number.

Additional advantages and modifications will readily occur to those skilled in the art. The invention in its broader terms is therefore, not limited to the specific details, representative apparatus, and illustrative examples shown and described.

What is claimed is:

1. A core of a motor comprising:
    a plurality of core sheets, which are of one type and are stacked together, each core sheet including:
        an inner annular portion,
        an outer annular portion; and
        a plurality of stays that are arranged at equal angular intervals in a circumferential direction of the core sheet and connect the inner annular portion to the outer annular portion, so that each adjacent two stays of the core sheet define a window opening therebetween, wherein:
    the inner annular portion has a rotatable shaft securing hole chat extends through a center of the inner annular portion in an axial direction of the core to receive a rotatable shaft of the motor, and the outer annular portion includes a plurality of teeth that are arranged at equal angular intervals in the circumferential direction of the core sheet and extend radially outward from the outer annular portion, wherein each adjacent two teeth of the core sheet define a slot therebetween;
    each core sheet further includes at least one projection, at least one recess and a receiving portion, which are all arranged along a concentric circle that is concentric to a rotational axis of the rotatable shaft of the motor, wherein the at least one projection is arranged in a first axial end surface of the core sheet, and the at least one recess and the receiving portion are arranged in a second axial end surface of the core sheet in such a manner that each one of the at least one projection of the core sheet is opposed to a corresponding one of the at least one recess of the core sheet in the axial direction of the core, and the receiving portion is displaced from the at least one projection of the core sheet in the axial direction of the core;
    at least two adjacent core sheets of the core sheets are displaced one after the other by a predetermined displacement angle in a circumferential direction of the core in such a manner that the stays of one of the at least two adjacent core sheets are partially overlapped with the stays of the other one of the at least two adjacent core sheets, respectively, and the slots of the one of the at least two adjacent core sheets are aligned with the slots of the other one of the at least two adjacent core sheets in the axial direction of the core, respectively, and the second axial end surface of the one of the at least two adjacent core sheets is opposed to the first axial end surface of the other one of the at least two adjacent core sheets, and each one of the at least one projection arranged in the first axial end surface of the other one of the at least two adjacent core sheets is substantially, entirely received in a corresponding one of the receiving portion and the at least one recess arranged in the second axial end surface of the one of the at least two adjacent core sheets, so that the first axial end surface of the other one of the at least two adjacent core sheets closely contacts the second axial end surface of the one of the at least two adjacent core sheets.

2. A core according to claim 1, wherein:

the at least one projection, the at least one recess and the receiving portion of each core sheet are arranged such that each core sheet is engageable with adjacent one of the core sheets only when each core sheet is placed in one of first and second angular positions with respect to the adjacent one of the core sheets;

each core sheet is placed in the first angular position when the receiving portion of each core sheet is aligned with the receiving portion of the adjacent one of the core sheets in the axial direction of the core; and each core sheet is placed in the second angular position when each core sheet is displaced by the predetermined displacement angle with respect to the adjacent one of the core sheets in the circumferential direction of the core.

3. A core according to claim 1, wherein the core sheets are progressively displaced one after the other by the predetermined displacement angle in the circumferential direction of the core in such a manner that the stays of the core sheets from a plurality of stairstep-shaped guide walls that are circumferentially spaced from each other and spirally extend in the axial direction of the core, wherein the stairstep-shaped guide walls guide and force air to flow in the axial direction of the core through the window openings of the core sheets when the core is rotated.

4. A core according to claim 1, wherein the receiving portion of each core sheet is a through hole that penetrates through the core sheet.

5. A core according to claim 1, wherein the receiving portion of each core sheet is a blind hole, and a portion of the first axial end surface of the core sheet, which opposes the blind hole in the axial direction of the core, is flat.

6. A core according to claim 1, wherein:

the at least one projection includes a plurality of projections; and the at least one recess includes plurality of recesses.

7. A core according to claim 1, wherein:

a number of the teeth of each core sheet is sixteen;

a number of the stays of each core sheet is seven; and the predetermined displacement angle is 202.5 degrees.

8. A core according to claim 7, wherein:

the stays of each core sheet include first to seventh stays, which an arranged in this order in a clockwise direction when the first to seventh stays are seen from the second axial end surface of the core sheet;

the recesses of each core sheet include first to third recesses, which are arranged in this order in the clockwise direction when the first to third recesses are seen from the second axial end surface of the core sheet, wherein a circumferential center of the first stay and a circumferential center of the first recess are aligned with a circumferential center of one of the teeth in a radial direction of the core sheet;

the receiving portion of each core sheet is positioned between the third recess and the first recess; and an angular interval between the first recess and the third recess, an angular interval between the third recess and the second recess, and an angular interval between the second recess and the receiving portion are all set 202.5 degrees.

9. A core according to claim 1, wherein the predetermined displacement angle is defined by the following equation: the predetermined displacement angle=(360 degrees−the angular interval of the teeth)/a number of the stays.

10. A core according to claim 1, wherein:

the teeth of each core sheet include sixteen teeth that are arranged at 22.5 degree intervals in the circumferential direction of the core sheet;

the stays of each core sheet include first to third stays, which are arranged in this order in a clockwise direction when the first to third stays are seen from the second axial end surface of the core sheet;

the at least one recess of each core sheet includes first to third recesses, which are arranged in this order in the clockwise direction when the first to third recesses are seen from the second axial end surface of the core sheet, wherein a circumferential center of the first stay and a circumferential center of the first recess are aligned with a circumferential center of one of the teeth in a radial direction of the core sheet;

the receiving portion of each core sheet is positioned between the third recess and the first recess;

an angular interval between the first recess and the second recess, an angular interval between the second recess and the third recess, and an angular interval between the third recess and the receiving portion are all set 112.5 degrees;

an angular interval between the receiving portion and the first recess is set to 22.5 degrees; and the predetermined displacement angle is 112.5 degrees.

11. A core according to claim 1, wherein:

the teeth of each core sheet include sixteen teeth that are arranged at 22.5 degree intervals in the circumferential direction of the core sheet;

the stays of each core sheet include first to fifth stays, which are arranged in this order in a clockwise direction when the first to fifth stays are seen from the second axial end surface of the core sheet;

the at least one recess of each core sheet includes first to fifth recesses, which are arranged in this order in the clockwise direction when the first to fifth recesses are seen from the second axial end surface of the core sheet, wherein a circumferential center of the first stay and a circumferential center of the first recess are aligned with a circumferential center of one of the teeth in a radial direction of the core sheet;

the receiving portion of each core sheet is positioned between the fifth recess and the first recess;

an angular interval between the first recess and the second recess, an angular interval between the second recess and the third recess, an angular interval between the third recess and the forth recess, an angular interval between the fourth recess and the fifth recess, and an angular interval between the fifth recess and the receiving portion are all act to 67.5 degrees;

an angular interval between the receiving portion and the first recess is set to 22.5 degrees; and the predetermined displacement angle is 67.5 degrees.

12. A core according to claim 1, further comprising a closure core sheet that is placed over any one of the core sheets to close the window openings of that core sheet.

13. A method for stacking a plurality of core sheets of a core of a motor, wherein the core sheets are of one type, and each core sheet includes an inner annular portion, an outer annular portion and a plurality of stays that are arranged at equal angular intervals in a circumferential direction of the core sheet and connect the inner annular portion to the outer annular portion, so that each adjacent two stays of the core sheet define a window opening therebetween, wherein the inner annular portion has a rotatable shaft securing hole that extends through a center of the inner annular portion in an axial direction of the core to receive a rotatable shaft of the motor, and the outer annular portion includes a plurality of teeth that are arranged at equal angular intervals in the circumferential direction of the core sheet and extend radially outward from the outer annular portion, wherein each adjacent two teeth of the core sheet define a slot therebetween, the method including:

stacking the core sheets such that the core sheets are progressively displaced one after the other by a predetermined displacement angle in a circumferential direction of the core in such a manner that the stays of the core sheets form a plurality stairstep-shaped guide walls that are circumferentially spaced from each other and spirally extend in the axial direction of the core, while the slots of one of each two adjacent core sheets are aligned with the corresponding slots of the other one of the two adjacent core sheets in the axial direction of the core, and the stairstep-shaped guide walls guide and force air to flow in the axial direction of the core through the window openings of the core sheets when the core is rotated, wherein:

each core sheet further includes at least one projection, at least one recess and a receiving portion, which are all arranged along a concentric circle that is concentric to a rotational axis of the rotatable shaft of the motor, wherein the at least one projection is arranged in a first axial end surface of the core sheet, and the at least one recess and the receiving portion are arranged in a second axial end surface of the core sheet in such a manner that each one of the at least one projection of the core sheet is opposed to a corresponding one of the at least one recess of the core sheet in the axial direction of the core, and the receiving portion is displaced from the at least one projection of the core sheet in the axial direction of the core; and the second axial end surface of the one of the two adjacent core sheets is opposed to the first axial end surface of the other one of the two adjacent core sheets, and each one of the at least one projection arranged in the first axial end surface of the other one of the two adjacent core sheets is substantially, entirely received in a corresponding one of the receiving portion and the at least one recess arranged in the second axial end surface of the one of the two adjacent core sheets, so that the first axial end surface of the other one of the two adjacent core sheets closely contacts the second axial end surface of the one of the two adjacent core sheets.

14. A core according to claim 1, wherein:

the receiving portion of each core sheet is a single receiving portion provided in each core sheet; and the single receiving portion of each core sheet is one of:
a through hole that penetrates through the core sheet; and
a blind hole, wherein a portion of the first axial end surface of the core sheet, which opposes the blind hole in the axial direction of the core, is flat.

15. A core according to claim 1, wherein:

the at least one projection includes a plurality of projections, wherein a number of the projections is equal to a number of the stays; and the at least one recess includes a plurality of recesses, wherein a number of the recesses is equal to the number of the stays.

16. A core according to claim 1, wherein:

the at least one projection includes a plurality of projections; and the at least one recess includes a plurality of recesses; and at least two adjacent projections of the plurality of projections are spaced from each other by the predetermined displacement angle, which is the same as the displacement angle of the at least two adjacent core sheets and is defined by the following equation: the predetermined displacement angle=(360 degrees−the angular interval of the teeth)/a number of the stays.

17. A core according to claim 16, wherein a displacement angle between two of the plurality of projections of each core sheet differs from the predetermined displacement angle.

18. A core according to claim 1, wherein a displacement angle between one of the plurality of stays of the one of the at least two adjacent core sheets and an axially opposed one of the plurality of stays of the other one of the at least two adjacent core sheets differs from a displacement angle of the plurality of teeth of each core sheet.

19. A core according to claim 1, wherein:

the at least one projection includes a plurality of projections; and the at least one recess includes a plurality of recesses; and a number of the projections of each core sheet is less than a number of the teeth of each core sheet.

20. A method according to claim 13, wherein:

the receiving portion of each core sheet is a single receiving portion provided in each core sheet; and the single receiving portion of each core sheet is one of:
a through hole that penetrates through the core sheet; and
a blind hole, wherein a portion of the first axial end surface of the core sheet, which opposes the blind hole in the axial direction of the core, is flat.

21. A method according to claim 13, wherein:

the at least one projection includes a plurality of projections, wherein a number of the projections is equal to a number of the stays; and the at least one recess includes a plurality of recesses, wherein a number of the recesses is equal to the number of the stays.

22. A method according to claim 13, wherein:

the at least one projection inches a plurality of projections; and the at least one recess includes a plurality of recesses; and at least two adjacent projections of the plurality of projections are spaced from each other by the predetermined displacement angle, which is the same as the displacement angle of the at least two adjacent core sheets and is defined by the following equation: the predetermined displacement angle=(360 degrees−the angular interval of the teeth)/a number of the stays.

23. A method according to claim 22, wherein a displacement angle between two of the plurality of projections of each core sheet differs from the predetermined displacement angle.

24. A method according to claim 13, wherein a displacement angle between one of the plurality of stays of the one of the at least two adjacent core sheets and an axially opposed one of the plurality of stays of the other one of the at least two adjacent core sheets differs from a displacement angle of the plurality of teeth of each core sheet.

25. A method according to claim 13, wherein:

the at least one projection includes a plurality of projections; and the at least one recess include a plurality of recesses; and a number of the projections of each core sheet is less than a number of the teeth of each core sheet.

26. A core of a motor comprising:

a plurality of core sheets that each comprise an inner annular portion and an outer annular portion, wherein the inner annular portion has a rotatable shaft securing hole and the outer annular portion includes a plurality of teeth;

a plurality of stays arranged at equal angular intervals that connect the inner annular portion to the outer annular portion, wherein each adjacent two stays of the plurality of stays defines a window opening there between, wherein the plurality of core sheets are displaced one after the other by a predetermined displacement angle in a circumferential direction of the core defined by the following equation: the predetermined displacement angle=(360 degrees−the angular interval of the teeth)/a number of the stays; and at least one projection, at least one recess and a receiving portion provided on each of the plurality of core sheets, wherein the at least one projection is arranged in a first axial end surface of the each of the plurality of core sheets, and the at least one recess and the receiving portion are arranged in a second axial end surface of the each of the plurality of core sheets in such a manner that each one of the at least one projection is opposed to a corresponding one of the at least one recess in the axial direction of the core, and the receiving portion is displaced from the at least one projection in an axial direction of the core.

27. A core according to claim 26, further comprising a closure core sheet that is placed over any one of the plurality of core sheets to close the window opening.

* * * * *